Patented July 30, 1940

2,209,907

UNITED STATES PATENT OFFICE 2,209,907

MANUFACTURE OF PIGMENTS

Omar F. Tarr, Stoneleigh, Md., assignor to Mutual Chemical Company of America, New York, N. Y., a corporation of New Jersey No Drawing. Application June 29, 1938, Serial No. 216,599

14 Claims. (Cl. 134—58)

This invention relates to improvements in the manufacture of chromic oxide pigments, etc. The invention includes an improved method for the manufacture of fluffy chromic oxide and chromium-containing pigments; and a new intermediate hydrated or hydrous chromic oxide.

In the application of Marc Darrin, Serial No. 212,392 there is described the manufacture of new fluffy chromic oxide pigments and new fluffy chromium-containing pigments, as well as a new intermediate hydrated or hydrous chromic oxide and a method for the production of such products.

The present invention provides a new and improved process for the production of such fluffy chromic oxide, and chromium-containing, pigments and a new intermediate hydrous chromic oxide particularly adapted for use in making such new fluffy pigments.

The invention includes a new method for the reduction of a solution of a chromate under regulated conditions to produce directly a bluish-green hydrated chromic oxide precipitate which may be readily filtered and, by suitable treatment with acid or electrolyte, freed from impurities such as alkali salts, and which has a distinctive physical or chemical structure such that upon direct firing under regulated conditions the new fluffy chromic oxide pigments can be directly produced.

The bluish-green hydrated chromic oxide thus obtainable is a new and distinctive product having apparently an internal coordination which adapts it for use directly for firing, under regulated conditions, to give the new fluffy chromic oxide pigments.

The invention also includes improvements in the treatment of the hydrous chromic oxide to free it from impurities such as alkali salts; and also improvements in the direct firing of the hydrous oxide to produce the new fluffy chromic oxide pigments.

In addition the invention includes improvements in the production of composite pigments and intermediate composite hydrated chromic oxide-containing products.

The invention will be further illustrated by the following more detailed description.

The fluffy chromic oxide pigments which can advantageously be produced by the present invention have a distinctive and characteristic structure, disintegrating without grinding to a fine, uniform, porous, soft, fluffy, green powder, the particles of which have a very fine skeleton or sponge-like structure. They are valuable paint pigments, having a low apparent specific gravity and desirable oil absorption properties, imparting body and viscosity to the oil without undesirable display of shortness; and a paste made with oil can be diluted without packing of the pigment which settles as a voluminous soft paste. These fluffy chromic oxide pigments have valuable properties which adapt them for use as permanent pigments for many purposes, combining in a superior manner with paint oils, forming stronger and clearer colors, having a greater range of shades, and possessing greater flexibility of combination with other materials than the ordinary dense forms of chromic oxide.

The ordinary method of producing chromic oxide is by firing a mixture of a bichromate, such as $Na_2Cr_2O_7$, with a reducing agent such as sulfur, whereby the bichromate is reduced to an insoluble green oxide held in a sintered mass of sodium sulfate ($Na_2SO_4$), which is removed by leaching with water, leaving as a residue the ordinary dense chromic oxide, having the empirical formula $Cr_2O_3$. For pigment purposes the coarse and hard crystalline particles are reduced to a fine powder by grinding, but the product is still very dense and somewhat abrasive in character.

The apparent specific gravity (grams per cubic centimeter of the sifted and lightly packed dry powder) of known grades of pure anhydrous chromic oxide, is from 1,337 to about 1.915.

In my prior application Serial No. 212,388 I have described an improved method for the reduction of alkali chromates in which an alkali chromate solution is gradually added to a hot aqueous alkaline emulsion of sulfur and sodium sulfide with resulting immediate reduction of the alkali chromate by the excess of alkaline sulfur emulsion and with avoidance of excess chromate during the process. The resulting hydrous chromic oxide, however, does not have the necessary properties to adapt it for direct firing to produce the new fluffy chromic oxide pigments.

In the application of Marc Darrin, Serial No. 212,392 there is described an improved method of reducing alkali chromates in which a solution of the chromate is gradually added to a boiling alkaline emulsion of sulfur in a sodium sulfide solution and with regulation of the alkalinity so as to maintain substantially uniform conditions throughout the reaction. This method of reduction gives an improved hydrous chromic oxide but this product does not give the new fluffy chromic oxide pigments on direct firing. By treatment of such hydrated oxide, after washing to remove alkali compounds, with sulfuric acid to form a sulfate combination of the hydrated oxide, an intermediate compound is produced, which is adapted, on direct firing, to give the new fluffy chromic oxide pigments.

The present invention provides an improved method of reducing chromates whereby there is directly produced a new intermediate hydrated oxide of a bluish-green color which is adapted directly, when freed from alkali compounds and subjected to regulated firing, to give the new fluffy chromic oxide pigments.

The improved reduction process of the present invention, like the process of my prior application and of the Darrin application, is carried out with the addition of a chromate solution to a hot aqueous alkaline emulsion of sulfur and alkali sulfide, with immediate reduction of the chromate by the excess alkaline reducing solution or emulsion; but the process of the present invention is distinguished from the processes of said prior applications by the addition, in regulated amount, of acid, or its equivalent, during the process, and with maintenance of a low and regulated alkalinity of the reducing solution or emulsion.

In carrying out the present process the acid is advantageously added to the chromate solution before it is added to the alkaline, aqueous emulsion of sulfur so that the alkali which is formed as a result of the reduction is neutralized to the necessary extent. I have, however, found that the acid can be added separately to the solution or to the emulsion to accomplish the same or a similar result.

The reduction of chromate alone, assuming the sulfur of the aqueous emulsion serves as the reducing agent, after dissolving to form sulfide, may be expressed by the following reaction:

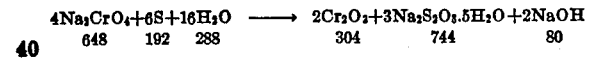

Where an alkaline emulsion of sulfur is used the sulfur dissolves to form alkali sulfide and, as the sulfur is used up in the reduction, additional sulfur dissolves, so that only the amount of alkali needed at the outset to form the initial reducing solution is needed. However, the additional alkali formed by the reduction tends to increase the alkalinity of the solution; and this alkalinity is neutralized, to the necessary extent, in the present process, by adding acid or its equivalent during the process. Apparently the control of the alkalinity during the process is essential for the production of the new bluish-green hydrated oxide which is adapted directly, after freeing from alkali compounds, for firing under regulated conditions to give the new fluffy chromic oxide pigment.

From the above formula or equation it is evident that, if an acid is added in quantity equivalent to the 2 mols. of caustic soda formed by the reaction, and if this acid is added progressively during the reaction, the alkalinity will be maintained throughout the course of the reaction at approximately its original value. I have found, however, that it is possible to use materially less acid than is required for complete neutralization of the alkali formed according to the above equation.

If the sulfur is all first dissolved as sulfide, using the necessary amount of caustic soda at the outset, a bichromate solution can be gradually added thereto and the new blush-green hydrous oxide produced. In the practical carrying out of the process, however, it is advantageous to use only a small amount of caustic soda at the outset, sufficient to dissolve enough of the sulfur to start the reaction, and to depend upon the further solution of sulfur as the reaction proceeds and as sulfur is consumed in the reduction. The amount of acid added, and its rate of addition, should not be such as will reduce the alkalinity of the solution below the point where the sulfur will continue to be dissolved, but a sufficient alkalinity to insure progressive solution of the sulfur should be maintained. On the other hand the increase in alkalinity should be prevented or regulated since apparently an excess amount of caustic soda formation interferes with or prevents the formation of the desired bluish-green hydrated oxide capable of direct conversion into the new fluffy chromic oxide pigments.

Different acids can be added to the chromate solution before it in turn is added to the alkaline sulfur emulsion, for example, chromic acid, sulfuric acid, etc.; or the acid can be added in the form of bichromate, added to the chromate solution. When chromic acid is added to the chromate solution in amount equivalent to the caustic soda produced by the foregoing equation, the reaction may be represented as follows:

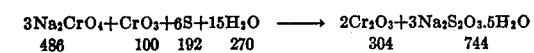

When sodium bichromate is added in corresponding amount the reaction may be represented as follows:

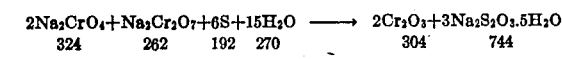

According to the reactions represented by the above equations, no free additional alkali would be generated during the process and the free alkali present would be only that added as such at the outset.

It has been found, however, that satisfactory results may be obtained by using less than the theoretical amount of acid or bichromate indicated in the above reactions, due perhaps to the fact that the hydrated oxide as precipitated seems to have the property of removing free alkali from the solution. Some of the alkali appears to be closely held by the precipitated hydated oxide sludge so that it does not serve to increase the alkalinity of the solution. While it is possible to use the full quantities of acid or acid materials indicated by the above reactions, satisfactory results have been obtained by using, for example, 1 mol. of sodium bichromate with 6 mols. of sodium chromate.

Instead of adding the acid or bichromate to the chromate solution, the chromate solution and acid may also be added separately.

The reduction process will be further illustrated by the following examples:

*Example 1.*—352 pounds of powdered sulfur are emulsified in a reaction kettle with 750 gallons of hot water (90° C.) to which have been added 40 pounds of caustic soda (NaOH). The caustic soda may react with the sulfur to form sodium sulfide or polysulfides. In a delivery tank, a chromate solution is made containing 972 pounds of sodium chromate (Na₂CrO₄) dissolved in 240 gallons warm water containing 126 pounds 60° B. sulfuric acid. This acidified chromate solution is run slowly with stirring into the heated (about 90° C.) sulfur emulsion which is in the reaction kettle. The rate of addition is such that the chromate is completely reduced as it is added. The time required may be, for example, about two hours.

When the reaction is complete, any remaining sodium sulfide is neutralized or converted into sodium thiosulfate by suitable treatment as, for example, with a small amount of bichromate, chromate, chromic acid, sulfuric acid, sulfur dioxide, or their combinations, with or without the addition of small extra amounts of sulfur emulsions, as slight variations in the operation may indicate, so that the end product consists of a hydrous chromic oxide suspended in an aqueous solution of sodium thiosulfate free from both sulfide and chromate.

The hydrated chromic oxide appears as a bluish-green sludge and is separated from the thiosulfate liquor, for example, by settling. The thiosulfate may be recovered from the solution by crystallization by known methods and is a valuable byproduct. The sludge contains all of the chromium in the form of a desired type of hydrous chromic oxide which after further treatment yields the fluffy green chromic oxide on direct firing. This hydrous chromic oxide may be washed with warm water which may contain a small amount of acid to assist in the removal of tightly held sodium compounds.

In the above example, instead of using sulfuric acid, equivalent amounts of other suitable acidic materials may be used, as, for instance, bichromates, chromic acid, etc.

*Example 2.*—450 pounds of sulfur are emulsified in a hot solution of 50 pounds of sodium hydroxide in 1,000 gallons of water and this solution is kept at a temperature in the neighborhood of 90° C. A solution is made by dissolving 755 pounds of sodium chromate ($Na_2CrO_4$) and 700 pounds of sodium bichromate ($Na_2Cr_2O_7.2H_2O$) in 300 gallons of hot water. The chromate solution is then slowly added, with constant agitation, to the hot emulsion maintained at around 90° C. at a rate not greater than the rate at which sulfur is dissolved to form sulfide.

The hydrous chromic oxide can then be separated, for example, as described in the preceding example.

*Example 3.*—A chromate solution is made by dissolving 1135 pounds of sodium chromate ($Na_2CrO_4$) and 350 pounds of sodium bichromate ($Na_2Cr_2O_7.2H_2O$) in 337 gallons of hot water and this solution is added to a hot sulfur emulsion such as described in the preceding example.

In the preceding examples the acid or acid material is added to the chromate solution before this solution is added to the sulfur emulsion. The acid or acid material may if desired be separately added directly to the emulsion although in general it is more advantageous to add the acid to the chromate and to add the composite acidified chromate solution to the hot sulfur emulsion.

The hydrous chromic oxide produced according to the above examples is a bluish-green oxide which apparently has the correct potential structure or framework, and the correct internal coordination, to adapt it for use directly in making the new fluffy chromic oxide pigments. It should, however, be freed substantially completely from adhering alkali compounds and this is advantageously accomplished by treatment with a thermally decomposable electrolyte, as, for example, dilute sulfuric acid. The hydrous chromic oxide sludge, after washing with water, may thus be slurried with dilute sulfuric acid and digested for several hours, preferably at 60 to 80° C. In general the amount of acid should not be greater than that corresponding to the two-thirds basic chromic sulfate, $O:Cr.SO_4.Cr:O$.

Some small amount of the acid may combine as such an insoluble basic sulfate but this appears unobjectionable since any sulfate so formed is decomposed thermally during the subsequent firing. After digestion, the acid treated hydrous chromic oxide may be separated by settling or filtration and given a water wash.

The thus treated hydrous chromic oxide, which may be partially sulfated to a limited extent by the dilute sulfuric acid treatment, is now ready for the firing operation. It is advantageously freed from excess water until it is in the form of a wet cake which may be introduced directly into the firing furnace; or the cake may be dried before firing.

The firing process is carried out by rapidly heating to a temperature of about 2400° F. or in general between 2300 and 2500° F. and holding the material at this temperature for only a limited period of time, depending somewhat upon the size of the furnace, the amount of the charge, and the method of firing; but the product should be removed from the furnace before the fluffy chromic oxide formed has been overheated, as this may convert it into a dense product.

The time required for the direct firing of the hydrated oxide depends on the temperature of the furnace and the size of the charge. It may approach flash firing. In a small laboratory furnace at 2400° F. a few minutes may be sufficient. With larger charges time must be allowed for the entire charge to be heated to around 2400° F. and to permit the heat to penetrate to the center of the charge; but care should be taken to avoid prolonged heating or too high a temperature which may tend to dull the shade of the pigment and cause the fluffy oxide to change to the dense variety. It is thus important, in carrying out the firing, that the material be heated rapidly to the necessary high temperature, without permitting it to come to equilibrium at intermediate stages of the heating; and it is also important that overheating or prolonged heating be avoided, such as would convert the desired fluffy oxide into a final dense form.

The firing of the hydrated oxide can advantageously be carried out in continuous type furnaces in which the heating can be rapidly effected and the product removed from the furnace without prolonged overheating.

The fluffy oxide produced by this firing operation does not stick to the hearth of the furnace and comes out as a crumbly mass which disintegrates on cooling to a fine, soft, fluffy green powder requiring no grinding. It is a fluffy chromic oxide having the empirical formula $Cr_2O_3$ and possesses superior properties as a pigment, having, for example, an apparent specific gravity between 0.300 and 0.900; an oil absorption between 20 and 30; unusually high tinting strength; a superior, pure, bright green mass color; and being a permanent pigment in all respects. Such a fluffy green chromic oxide may analyze 99.9% $Cr_2O_3$.

This fluffy chromic oxide pigment has the desirable properties described at some length in the said application of Darrin, Serial No. 212,392. According to the process of the Darrin application, the fluffy chromic oxide pigment is obtained from a sulfate combination or syrup made by treating hydrated chromic oxide with strong sulfuric acid to form a sulfate combination in the form of a syrup. The present process enables these new valuable fluffy chromic oxide pigments to be produced in a simpler and more advantageous manner without the intermediate production of the syrupy sulfate combination, and with direct firing of the new bluish-green hydrous chromic oxide prepared by the improved reduction process of the present invention.

The new fluffy chromic oxide has a distinctive and characteristic structure. It disintegrates without grinding to a fine, uniform, porous, soft, fluffy, green powder the particles of which have a very fine skeleton or sponge-like structure. It is a valuable paint pigment, having a low apparent specific gravity and desirable oil absorption properties, imparting body and viscosity to the oil, without undesirable display of shortening; and a paste made with oil can be diluted without packing of the pigment which settles as a voluminous soft layer.

The apparent specific gravity (grams per cubic centimeter of the sifted and lightly packed dry powder) of previously known grades of pure anhydrous chromic oxide examined was found to be between 1.337 and 1.915, whereas the apparent specific gravities of most varieties of the fluffy chromic oxide produced by the process of this invention fall between 0.300 and 0.900, and all fall between 0.200 and 1.200.

The oil absorption of the fluffy oxide produced in accordance with the present invention may vary. Most variations of this chromic oxide have an oil absorption between 20.0 and 30.0, and all between 18.5 and 50.0.

While I do not wish to limit myself by any theoretical explanation of the nature of the process and the structure of the product, I am led to believe that the new reduction process results in directly producing a hydrous chromic oxide of a bluish-green color and of a single internal coordinated structure such that this hydrous oxide, on firing, gives directly the fluffy chromic oxide pigments, because of such internal coordination imparted thereto during the improved method of producing the hydrous oxide.

Valuable composite pigments containing the fluffy chromic oxide in combination with other oxides (whether in a physically admixed or chemically combined state) can advantageously be prepared by adding solutions of decomposable salts of other metals to the hydrous chromic oxide to form homogeneous admixtures therewith before firing. Solutions of many inorganic compounds may be added, either during the acid treatment stage, or directly incorporated with the moist hydrous cake before firing. On firing, homogeneous, soft, fluffy, composite pigments are obtained. Even small amounts of such addition products may modify the pigment very materially. For example, as little as 0.2% of phosphoric acid ($H_3PO_4$) on the basis of the $Cr_2O_3$ content, may change the mass tone to a decidedly lighter, but brighter and clearer shade of green. Likewise compounds of aluminum or cobalt or both may be employed to produce new composite, fluffy, permanent pigments. Such compounds may be added in solution and precipitated, for example, by ammonia. When added in the form of salts, care should in general be taken to avoid the presence of alkali compounds which appear harmful if present in any appreciable amount in the pigments. In the case of added aluminum compounds the resulting chrome-alumina oxide retains the soft, porous, fluffy structure, and may be even a clearer, greener, brighter, green color notwithstanding the fact that less chromium is present. Such a composite pigment appears particularly suitable for printing inks and paints.

The addition of alumina or phosphate appears to retard the speed at which the new fluffy oxides change to the dense type of oxide at high firing temperatures, with the result that the presence of small amounts of harmful impurities, such as traces of alkali compounds, are partially counteracted, and minor variations in operation, or in raw materials, have less effect on the shade of the finished product.

In the case of composite chrome-alumina pigments, aluminum sulfate may be added as the source of alumina. Good results can be obtained, for example, with from 3 to 20% aluminum oxide ($Al_2O_3$) on the basis of the final oxide complex. Practically all the $SO_3$ of the added aluminum sulfate, or present in the acid-treated hydrated chromic oxide, is driven off during the firing operation.

The composite chrome-alumina pigments may contain the oxides in some form of chemical combination, since the properties are different from those of physical mixtures of the respective oxides. The chrome-alumina pigments possess the same general type of desirable properties and applications as the pure fluffy chromic oxide green pigments. The apparent specific volume, oil absorption and related properties are somewhat modified by the combination with alumina.

Especially desirable pigments ranging in color from blue to green may be made by incorporation of combinations of soluble cobalt and aluminum salts, as for instance cobaltous nitrate and aluminum sulfate and firing as hereinbefore described. Good results may be obtained for example with from 2 to 30% of cobalt oxide (CoO) on the basis of the final oxide complex. Composite chrome-cobalt, and chrome-cobalt alumina pigments can thus be produced such as are described, for example, in somewhat more detail in the Darrin application Serial No. 212,392. These same or similar pigments can be advantageously produced by the improved process of the present invention.

If a large proportion of metallic oxide, such as that of cobalt, is present in the final fluffy product, the product may not disintegrate to a powder upon withdrawal from the furnace. It is, however, quite soft and friable, breaking readily into a fine, fluffy powder on light crushing.

It will thus be seen that the present invention provides a new and improved process, of a simple and advantageous nature for the production of fluffy chromic oxide pigments and of fluffy, composite, chromium-containing pigments. The invention includes a new and improved method of reducing chromates in solution by the addition of a solution of chromate and an acid in regulated proportions to a hot, aqueous, alkaline emulsion of sulfur and the carrying out of the reduction under conditions where the alkalinity of the solution is maintained at or close to the minimum at which the reduction will take place in a reasonable length of time. This improved reduction method makes possible the production of the new bluish-green hydrous oxide which can be directly fired to produce the new fluffy chromic oxide pigments; and the invention also includes an improved method of producing such fluffy pigments as well as improvements in the steps of said process.

I claim:

1. The method of reducing alkali chromates and of producing hydrous chromic oxide adapted on rapid firing to give a fluffy chromic oxide pigment which comprises gradually adding a solution of an alkali chromate to a hot, aqueous, alkaline sulfide reducing solution and also adding acid to neutralize at least a part of the alkali formed by the reduction.

2. The method of reducing alkali chromates and of producing hydrous chromic oxide adapted on rapid firing to give a fluffy chromic oxide pigment which comprises gradually adding an alkali chromate solution to a hot, aqueous, alkaline emulsion of sulfur and sodium sulfide and also adding acid to said emulsion to neutralize at least a part of the alkali formed by said reduction.

3. The method of reducing alkali chromates and of producing hydrous chromic oxide adapted on rapid firing to give a fluffy chromic oxide pigment which comprises gradually adding a chromate solution and acid to a hot, alkaline emulsion of sulfur and sodium sulfide, the rate of addition being such that the chromate is immediately reduced and the amount and rate of acid addition being such that some sulfide is always present up to the completion of the reaction and at least a part of the alkali formed by the reaction is neutralized.

4. The method of reducing alkali chromates and of producing hydrous chromic oxide adapted on rapid firing to give a fluffy chromic oxide pigment which comprises gradually adding a partly acidified chromate solution to a hot, aqueous, alkaline emulsion of sulfur and sodium sulfide at such a rate that some sulfide is always present up to the completion of the reaction.

5. The method of reducing alkali chromates and of producing a bluish-green hydrous chromic oxide adapted on rapid firing to give a fluffy chromic oxide pigment which comprises gradually adding an alkali chromate solution and an acid to a hot, aqueous, alkaline emulsion of sulfur and sodium sulfide at such a rate that some sulfide is always present up to the completion of the reaction, and the alkalinity of the solution being controlled at the outset and by the addition of acid so as to permit continued dissolving of sulfur and to insure the production of the bluish-green chromic oxide.

6. The method of producing a fluffy chromic oxide pigment which comprises reducing an alkali chromate by the gradual addition of an alkali chromate and acid to a hot, aqueous alkaline emulsion of sulfur and alkali sulfide, regulating the addition of acid to control the alkalinity of the solution and to give a bluish-green hydrous chromic oxide having a structure adapting it to give on direct firing a fluffy chromic oxide pigment, removing alkali compounds from said hydrous oxide, and effecting rapid firing of said oxide to a temperature around 2300 to 2500° F. for a limited time to produce said fluffy oxide.

7. The method of producing a fluffy chromic oxide pigment which comprises rapidly firing the hydrous chromic oxide produced by the process of claim 1 to a temperature around 2300 to 2500° F. for a limited time.

8. The method of producing composite chromium-containing fluffy pigments which comprises adding a decomposable pigment-modifying metal compound of at least one metal other than chromium, to the hydrous chromic oxide produced by the process of claim 1, and subjecting said composite product to rapid firing to a temperature around 2300 to 2500° F. for a limited period of time to produce a composite fluffy pigment.

9. The method of producing composite fluffy pigments containing chromium and also containing at least one of the class consisting of cobalt and aluminum which comprises adding a decomposable compound of at least one of the class consisting of cobalt and aluminum to the hydrous chromic oxide produced by the process of claim 1, and subjecting the composite product to rapid firing for a limited time to a temperature around 2300 to 2500° F. to produce a composite fluffy pigment.

10. A new, soft, fluffy, anhydrous chromic oxide pigment of light, bright green color having an apparent specific gravity between 0.2 and 1.2 and an oil absorption between 20 and 50, said pigment containing a small amount of a phosphorus-oxygen compound formed therein by firing a phosphate therein.

11. The process of claim 6 in which a small amount of a phosphate is added to the hydrous chromic oxide before firing.

12. The process as in claim 1 in which the hydrous chromic oxide produced is digested with an acidic thermally decomposable electrolyte to effect substantially complete removal of alkali compounds.

13. The hydrous chromic oxide produced by the process of claim 1 and adapted on rapid firing to give a fluffy chromic oxide pigment.

14. The hydrous chromic oxide produced by the process of claim 3 and adapted on rapid firing to give a fluffy chromic oxide pigment.

OMAR F. TARR.